US008625622B2

(12) United States Patent
Dukkipati et al.

(10) Patent No.: US 8,625,622 B2
(45) Date of Patent: Jan. 7, 2014

(54) INCREASING TRANSMISSION RATE TO A REMOTE DEVICE IN RESPONSE TO ATTRIBUTING INFORMATION LOSS AS NOT BEING A RESULT OF NETWORK CONGESTION

(75) Inventors: Nandita Dukkipati, Menlo Park, CA (US); Sangtae Ha, Princeton, NJ (US); Vijaynarayanan Subramanian, Sunnyvale, CA (US); Flavio Giovanni Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 536 days.

(21) Appl. No.: 12/647,426

(22) Filed: Dec. 25, 2009

(65) Prior Publication Data
US 2011/0158253 A1    Jun. 30, 2011

(51) Int. Cl.
*H04L 12/28*       (2006.01)
(52) U.S. Cl.
USPC ............ 370/412; 370/229; 370/235; 370/230
(58) Field of Classification Search
USPC .............. 370/229, 230, 231, 230.1, 232, 233, 370/234, 235, 236, 252, 394, 477, 412, 370/465; 709/225, 226, 227, 228, 229
See application file for complete search history.

(56) References Cited

U.S. PATENT DOCUMENTS

| 5,974,028 | A    |    10/1999 | Ramakrishnan |          |
|-----------|------|-----------:|--------------|---------:|
| 6,625,118 | B1 * |    9/2003  | Hadi Salim et al. | 370/229 |
| 6,958,997 | B1 * |    10/2005 | Bolton       | 370/392  |
| 7,394,762 | B2 * |    7/2008  | Leith et al. | 370/229  |
| 7,788,348 | B2 * |    8/2010  | Rinne        | 709/220  |
| 8,155,051 | B2 * |    4/2012  | Kim          | 370/318  |
| 2001/0032269 | A1 * | 10/2001  | Wilson       | 709/235  |
| 2003/0088690 | A1 * | 5/2003   | Zuckerman et al. | 709/232 |
| 2003/0097461 | A1 * | 5/2003   | Barham et al. | 709/235 |
| 2004/0003107 | A1 * | 1/2004   | Barham et al. | 709/235 |
| 2004/0133391 | A1 * | 7/2004   | Bovo et al.  | 702/178  |
| 2004/0192312 | A1 * | 9/2004   | Li et al.    | 455/445  |
| 2004/0218617 | A1   | 11/2004  | Sagfors      |          |
| 2004/0264370 | A1 * | 12/2004  | Moon et al.  | 370/229  |
| 2005/0018617 | A1 * | 1/2005   | Jin et al.   | 370/252  |
| 2005/0117515 | A1 * | 6/2005   | Miyake       | 370/231  |
| 2005/0144303 | A1 * | 6/2005   | Zhang et al. | 709/231  |
| 2005/0152280 | A1 * | 7/2005   | Pollin et al. | 370/252 |
| 2005/0201279 | A1 * | 9/2005   | Tan et al.   | 370/229  |

(Continued)

OTHER PUBLICATIONS

W. Stevens, "TCP Slow Start, Congestion Avoidance, Fast Retransmit, and Fast Recovery Algorithms," RFC 2001, The Internet Society, Jan. 1997, 6 pages.
Raj Jain, "A Delay-Based Approach for Congestion Avoidance in Interconnected Heterogeneous Computer Networks," Digital Equipment Corporation, ACM CCR, vol. 19.5, Apr. 11, 1989, 16 pages.

(Continued)

*Primary Examiner* — Abdullah Riyami
(74) *Attorney, Agent, or Firm* — The Law Office of Kirk D. Williams

(57) ABSTRACT

In response to a detected loss of previously transmitted information by an apparatus communicating with a remote device (e.g., using TCP), the rate of transmission of information is increased by the apparatus in response to attributing the detected loss of previously transmitted information as not being caused by congestion. This attribution of the packet loss is typically determined based on roundtrip delays between sent information and received corresponding acknowledgments, which may be used directly or indirectly, such as by estimating network queuing delays based on the measured roundtrip delays.

11 Claims, 7 Drawing Sheets

(56) References Cited

U.S. PATENT DOCUMENTS

| | | | |
|---|---|---|---|
| 2005/0201284 A1* | 9/2005 | Cheriton | 370/232 |
| 2006/0034286 A1* | 2/2006 | Koning et al. | 370/394 |
| 2006/0114836 A1* | 6/2006 | Pollin et al. | 370/252 |
| 2009/0323679 A1* | 12/2009 | Anandakumar et al. | 370/352 |
| 2010/0008245 A1* | 1/2010 | Viger et al. | 370/252 |
| 2010/0158032 A1* | 6/2010 | Carlsson | 370/412 |
| 2011/0013605 A1* | 1/2011 | Moeller | 370/338 |

OTHER PUBLICATIONS

Xu et al., "Binary Increase Congestion Control for Fast, Long Distance Networks," IEEE INFOCOM, 2004, 13 pages.

N.K.G. Samaraweera, "Non-congestion packet loss detection for TCP error recovery using wireless links," IEEE Proc. vol. 146, 4, Aug. 1999, pp. 222-230.

* cited by examiner

Initialization:
601  $\gamma_L \leftarrow 0.25;\ \gamma_H \leftarrow 0.35;\ cntRTT \leftarrow 0;\ sumRTT \leftarrow 0$
  $blast\_reset();\ prev \leftarrow 0;\ cur \leftarrow 0;\ nxt \leftarrow 0$ On_each_ACK:
602  begin
  $dMin \leftarrow min(dMin, RTT)$
  $mRTT \leftarrow median\ filter(RTT)$
  $sRTT \leftarrow 7/8 * sRTT + 1/8 * mRTT$
  $dMax \leftarrow max(dMax, sRTT)$
  $sumRTT \leftarrow sumRTT + RTT;\ cntRTT \leftarrow cntRTT + 1$
  end At_the_start_of_each_RTT_round:
  begin
603  $prev\_delay \leftarrow avg\_delay()$
  $cntRTT \leftarrow 0;\ sumRTT \leftarrow 0$
  end Packet_loss:
604  begin
  $ssthresh \leftarrow recalc\_ssthresh()$
  end Fast_Recovery_for_each_ACK:
605  begin
  // Maintain pipe num. of packets during Fast Recovery
  $pipe \leftarrow ssthresh$
  $is\_cong \leftarrow loss\_predictor()$
  // If it is not congestion, gradually increase the sending rate by increasing the pipe variable.
  // The pipe variable does a same role with cwnd during Fast Recovery.
  if !is_cong then
    $pipe \leftarrow pipe + bictcp\_update()$
  if $snd\_una \geq high\_seq$ then
    // Rate control over every round during Fast Recovery.
    // When consecutive Fast Recovery is entered because of high loss rates, calculate the
    // rate over every Fast Recovery round by calling recalc_ssthresh(), which ultimately
    // calls loss_predictor() again. Therefore, congestion measure is done over every
606  // Fast Recovery round as well.
  $pipe \leftarrow recalc\_ssthresh()$
  $prev\_delay \leftarrow avg\_delay()$
  end Timeout:
begin
  $blast\_reset()$
end

FIGURE 6A

```
recalc_ssthresh():
607  begin
        is_cong ← loss_predictor()
        if is_cong then ssthresh ← bictcp_recalc_ssthresh()
        else ssthresh ← cwnd
        return ssthresh
     end 608  loss_predictor():
     begin
        // Identify the congestion-related losses using D
        if avg_delay() ≤ low_threshold() then is_cong ← 0
        else if avg_delay() > high_threshold() then is_cong ← 1
        else
        // Is the delay increasing in the grey zone ?
        if avg_delay() > prev_delay then is_cong ← 1
        else is_cong ← 0
        return is_cong
     end 609  median_filter(RTT):
     begin
        prev ← cur; cur ← nxt; nxt ← RTT
        cur ← max(min(prev, nxt), cur)
        cur ← min(max(prev, nxt), cur)
        return cur
     end 610  avg_delay():
     begin
        if cntRTT > 0 and sumRTT > 0 then
            return max( sumRTT / cntRTT - dMin, 0)
        else return 0
     end 611  low_threshold():
     begin
        return γL * (dMax - dMin)
     end 612  high_threshold():
     begin
        return γH * (dMax - dMin)
     end 613  blast_reset():
     begin
        bictcp_reset();   prev_delay ← 0; dMin ← ∞; dMax ← 0
     end
```

FIGURE 6B

INCREASING TRANSMISSION RATE TO A REMOTE DEVICE IN RESPONSE TO ATTRIBUTING INFORMATION LOSS AS NOT BEING A RESULT OF NETWORK CONGESTION

TECHNICAL FIELD

The present disclosure relates generally to communicating information with remote device over a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Transmission Control Protocol (TCP) is used extensively in networks, such as the Internet, to reliably communicate information between devices. This reliability is based on the sender receiving acknowledgements from the receiver in response to successfully receiving packets. The performance of TCP also depends upon whether or not acknowledgements are received for sent packets. In response to an acknowledgment, the sender TCP slowly increases the rate at which it sends packets. Conversely, if the sender TCP does not receive such an acknowledgement for a sent packet, it decreases, such as by half, its rate of packet transmission based on the assumption that the packet was lost due to network congestion. Note, the sender TCP will continue slowly increasing its transmission rate of packets in response to receiving an acknowledgement of a sent packet.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 6A-B illustrate a process performed in one embodiment.

DESCRIPTION OF EXAMPLE EMBODIMENTS

1. Overview

Figure 1:
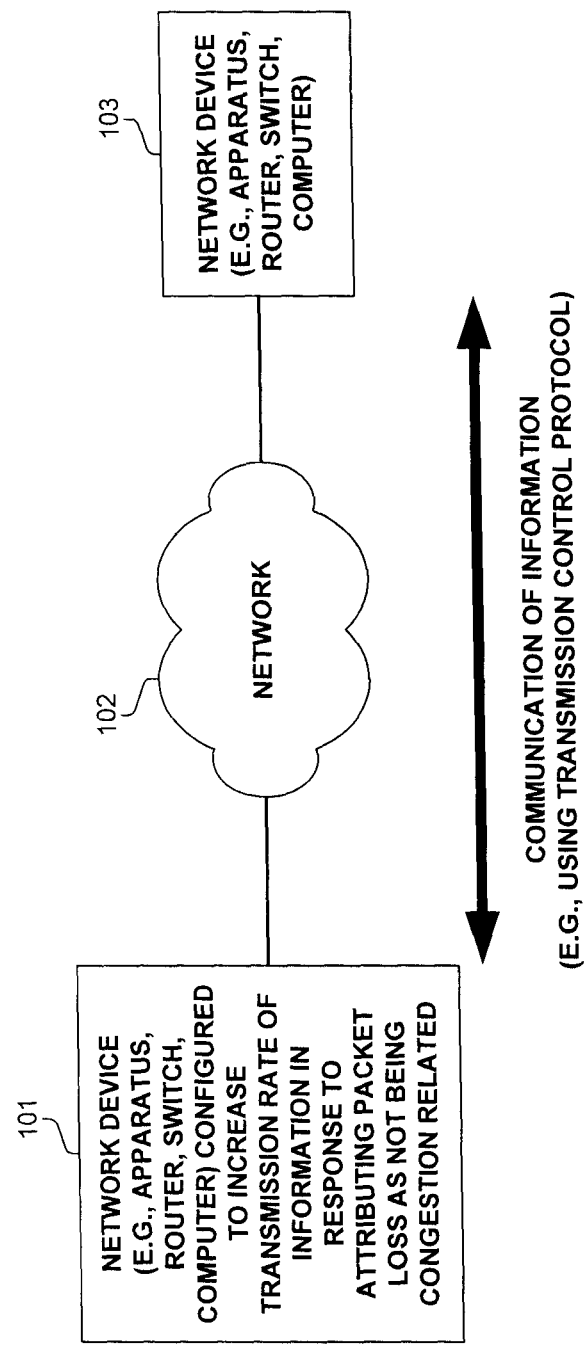
FIG. 1 illustrates a network operating according to one embodiment.

Disclosed are, inter alia, methods, apparatus, computer-storage media, mechanisms, and means associated with the rate of transmitting information to a remote device in response to attributing a detected loss of previous information sent to the remote device as not being a result of network congestion. One embodiment includes an apparatus, comprising one or more processing elements and memory configured to communicate information with a remote device over a network, which includes: in response to a detected loss of previously transmitted information by the apparatus, increasing the rate of transmission of information by the apparatus in response to attributing the detected loss of previously transmitted information as not being caused by congestion.

In one embodiment, this communication of information is performed using Transmission Control Protocol (TCP), and wherein said attributing of the detected loss of previously transmitted information as not being caused by congestion includes measuring a plurality of measured roundtrip delays between information sent from the apparatus to the remote device and an acknowledgement received by the apparatus corresponding to said sent information. In one embodiment, said attributing of the detected loss of previously transmitted information as not being caused by congestion includes estimating that queuing delays within the network between the apparatus and the remote device have not increased therefore not causing the detected loss. In one embodiment, a current queuing delay is determined based on a minimum of measured roundtrip delays, an average of measured roundtrip delays, and/or a median, smooth-filtered maximum of measured roundtrip delays.

2. Description

Disclosed are, inter alia, methods, apparatus, computer-storage media, mechanisms, and means associated with the rate of transmitting information to a remote device in response to attributing a detected loss of previous information sent to the remote device as not being a result of network congestion. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with the rate of transmitting information to a remote device in response to attributing a detected loss of previous information sent to the remote device as not being a result of network congestion. In one embodiment, in response to a detected loss of previously transmitted information by an apparatus communicating with a remote device (e.g., using TCP), the rate of transmission of information is increased by the apparatus in response to attributing the detected loss of previously transmitted information as not being caused by congestion. This attribution of the packet loss is typically determined based on roundtrip delays between sent information and received corresponding acknowledgments, which may be used directly or indirectly, such as by estimating network queuing delays based on the measured roundtrip delays.

One embodiment includes an apparatus, comprising: one or more processing elements and memory configured to communicate information with a remote device over a network; wherein said communication with the remote device includes, in response to a detected loss of previously transmitted information by the apparatus: increasing the rate of transmission of information by the apparatus in response to attributing the detected loss of previously transmitted information as not being caused by congestion.

In one embodiment, said communication of information is performed using Transmission Control Protocol (TCP), and wherein said attributing of the detected loss of previously transmitted information as not being caused by congestion includes measuring a plurality of measured roundtrip delays between information sent from the apparatus to the remote device and an acknowledgement received by the apparatus corresponding to said sent information.

In one embodiment, said communication using TCP with the remote device includes a loss recovery phase of said TCP communications triggered by the detected loss of previously transmitted information, with the loss recovery phase including performing active congestion control, with said active congestion control including said increasing the rate of transmission of information by the apparatus in response to attributing said detected loss of previously transmitted information as not being caused by congestion based on a plurality of measured roundtrip delays between information sent from the apparatus to the remote device and an acknowledgement received by the apparatus corresponding to said sent information; and wherein the loss recovery phase includes reducing the rate of transmission of information by the apparatus in response to attributing said detected loss of previously transmitted information as being caused by congestion. In one embodiment, communication using TCP with the remote device includes using a congestion window (cwnd) for reacting to network conditions; and wherein said increasing the rate of transmission of information includes increasing the congestion window (cwnd); and wherein said reducing the rate of transmission includes decreasing the congestion window (cwnd). In one embodiment, said attributing the detected loss of previously transmitted information as not being caused by congestion based on a plurality of measured roundtrip delays between information sent from the apparatus to the remote device and an acknowledgement received by the apparatus corresponding to said sent information includes determining a plurality of queuing delays based on the plurality of measured roundtrip delays and said attributing said detected loss of previously transmitted information as not being caused by congestion based on the plurality of queuing delays.

In one embodiment, said attributing the detected loss of previously transmitted information as not being caused by congestion based on a plurality of measured roundtrip delays between information sent from the apparatus to the remote device and an acknowledgement received by the apparatus corresponding to said sent information includes determining a plurality of queuing delays based on the plurality of measured roundtrip delays and said attributing said detected loss of previously transmitted information as not being caused by congestion based on the plurality of queuing delays. In one embodiment, a current queuing delay is determined based on a minimum of a plurality of said measured roundtrip delays and one or more of said measured roundtrip delays. In one embodiment, the current queuing delay is determined based on a difference of said one or more of said measured roundtrip delays with said minimum of a plurality of said measured roundtrip delays. In one embodiment, the current queuing delay is determined based on an average of a plurality of said measured roundtrip delays, a minimum of a plurality of said measured roundtrip delays, and a median, smooth-filtered maximum of a plurality of said measured roundtrip delays.

In one embodiment, said attributing of the detected loss of previously transmitted information as not being caused by congestion includes estimating that queuing delays within the network between the apparatus and the remote device have not increased therefore not causing the detected loss. In one embodiment, said communication of information is performed using Transmission Control Protocol (TCP). In one embodiment, a current queuing delay of said queuing delays is determined based on a difference of one or more measured roundtrip delays with a minimum of a plurality of measured roundtrip delays. In one embodiment, a current queuing delay of said queuing delays is determined based on an average of a plurality of a plurality of measured roundtrip delays, a minimum of a plurality of the plurality of measured roundtrip delays, and a median, smooth-filtered maximum of a plurality of the plurality of measured roundtrip delays.

One embodiment includes a method, comprising: communicating, by a particular apparatus, with a remote device over a network; wherein said communication with the remote device includes, in response to a detected loss of previously transmitted information by the particular apparatus: increasing the rate of transmission of information by the particular apparatus in response to attributing said detected loss of previously transmitted information as not being caused by congestion based on a current queuing delay determined based on measured roundtrip delays between information sent from the particular apparatus to the remote device and an acknowledgement received by the particular apparatus corresponding to said sent information.

In one embodiment, in response to the detected loss of previously transmitted information by the particular apparatus: decreasing the rate of transmission of information by the particular apparatus in response to attributing said detected loss of previously transmitted information as being caused by congestion based on the current queuing delay. In one embodiment, said communicating with the remote device over the network includes using Transmission Control Protocol (TCP). In one embodiment, communicating using TCP with the remote device includes using a congestion window (cwnd) for reacting to network conditions; and wherein said increasing the rate of transmission of information includes increasing the congestion window (cwnd); and wherein said decreasing the rate of transmission of information includes decreasing the congestion window (cwnd). One embodiment includes determining the current queuing delay based on a minimum of a plurality of said measured roundtrip delays and one or more of said measured roundtrip delays. One embodiment includes determining the current queuing delay based on a difference of said one or more of said measured roundtrip delays with said minimum of a plurality of said measured roundtrip delays. One embodiment includes determining the current queuing delay based on an average of a plurality of said measured roundtrip delays, a minimum of a plurality of said measured roundtrip delays, and a median, smooth-filtered maximum of a plurality of said measured roundtrip delays. In one embodiment, in response to the detected loss of previously transmitted information by the particular apparatus: decreasing the rate of transmission of information by the particular apparatus in response to attributing said detected loss of previously transmitted information as being caused by congestion based on the current queuing delay. In one embodiment, said attributing said detected loss of previously transmitted information as not being caused by congestion based on the current queuing delay includes determining that an average queuing delay is not greater than a previously determined average queuing delay not including the current queuing delay. One embodiment includes: in response to the detected loss of previously transmitted information by the particular apparatus: decreasing the rate of transmission of information by the particular apparatus in response to attributing said detected loss of previously transmitted information as being caused by congestion based on the current queuing delay.

One embodiment includes an apparatus, comprising: one or more processing elements and memory configured to communicate using Transmission Control Protocol (TCP) with a remote device over a network; wherein said communication using TCP with the remote device includes using a congestion window (cwnd) for reacting to network conditions; wherein said communication with the remote device using TCP includes characterizing the roundtrip delay between the apparatus and the remote device based on measured roundtrip delay for a plurality of sent information and corresponding received acknowledgements; and wherein said communication with the remote device using TCP includes: in response to an identified loss of particular information sent to the remote device and a determination based on said maintained characterization of the roundtrip delay, increasing the congestion window (cwnd). In one embodiment, the determination based on said maintained characterization of the roundtrip delay distinguishes between information loss due to network congestion and information loss due to another cause.

Expressly turning to the figures, FIG. 1 illustrates a network operating according to one embodiment. As shown, network device 101 (e.g., apparatus, router, switch, computer, personal device, etc.) is configured to communicate information, such as, but not limited to, using Transmission Control Protocol, with network device 103 across network 102. Network device 101 is configured to increase its rate of transmission of information despite sent information be lost, in response to attributing the loss of information as not being congestion related. Typically, prior TCP implementation will decrease its rate of transmission of information for any cause, or at least not increasing its rate of transmission in response to a packet loss. Note, in one embodiment, network device 103 is also configured to increase its rate of transmission of information despite sent information be lost, in response to attributing the loss of information as not being congestion related.

Figure 2:
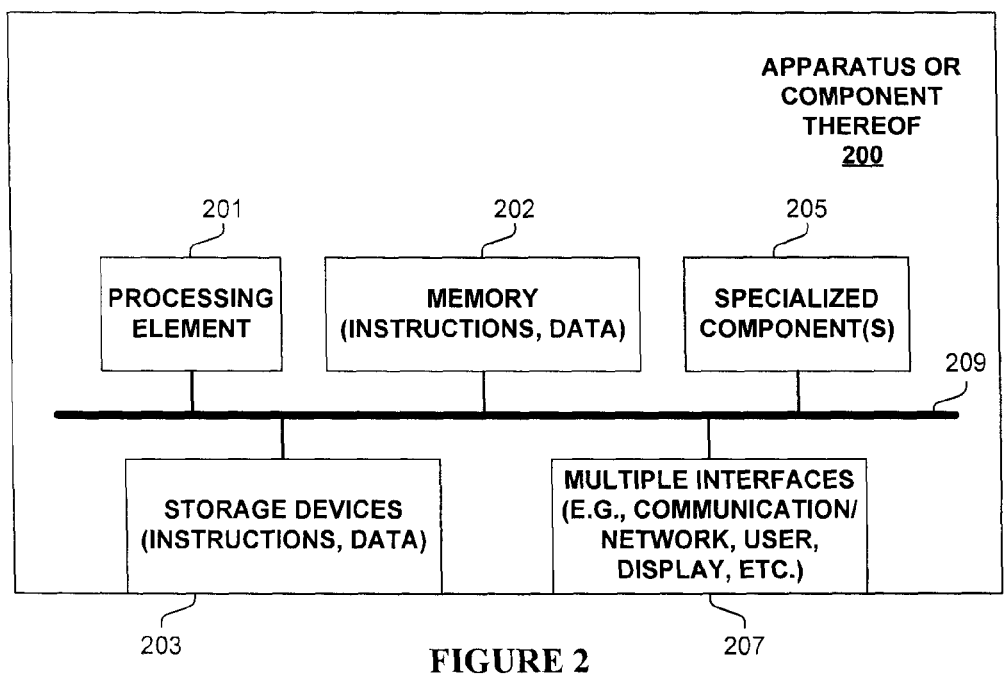
FIG. 2 illustrates an apparatus or component used in one embodiment.

FIG. 2 is block diagram of an apparatus or component 200 used in one embodiment associated with the rate of transmitting information to a remote device in response to attributing a detected loss of previous information sent to the remote device as not being a result of network congestion. In one embodiment, system or component 200 performs one or more processes corresponding to one of the flow diagrams illustrated or otherwise described herein.

In one embodiment, apparatus or component 200 includes one or more processing elements 201, memory 202, storage device(s) 203, specialized component(s) 205 (e.g., optimized hardware such as for performing operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, network device 101 of FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
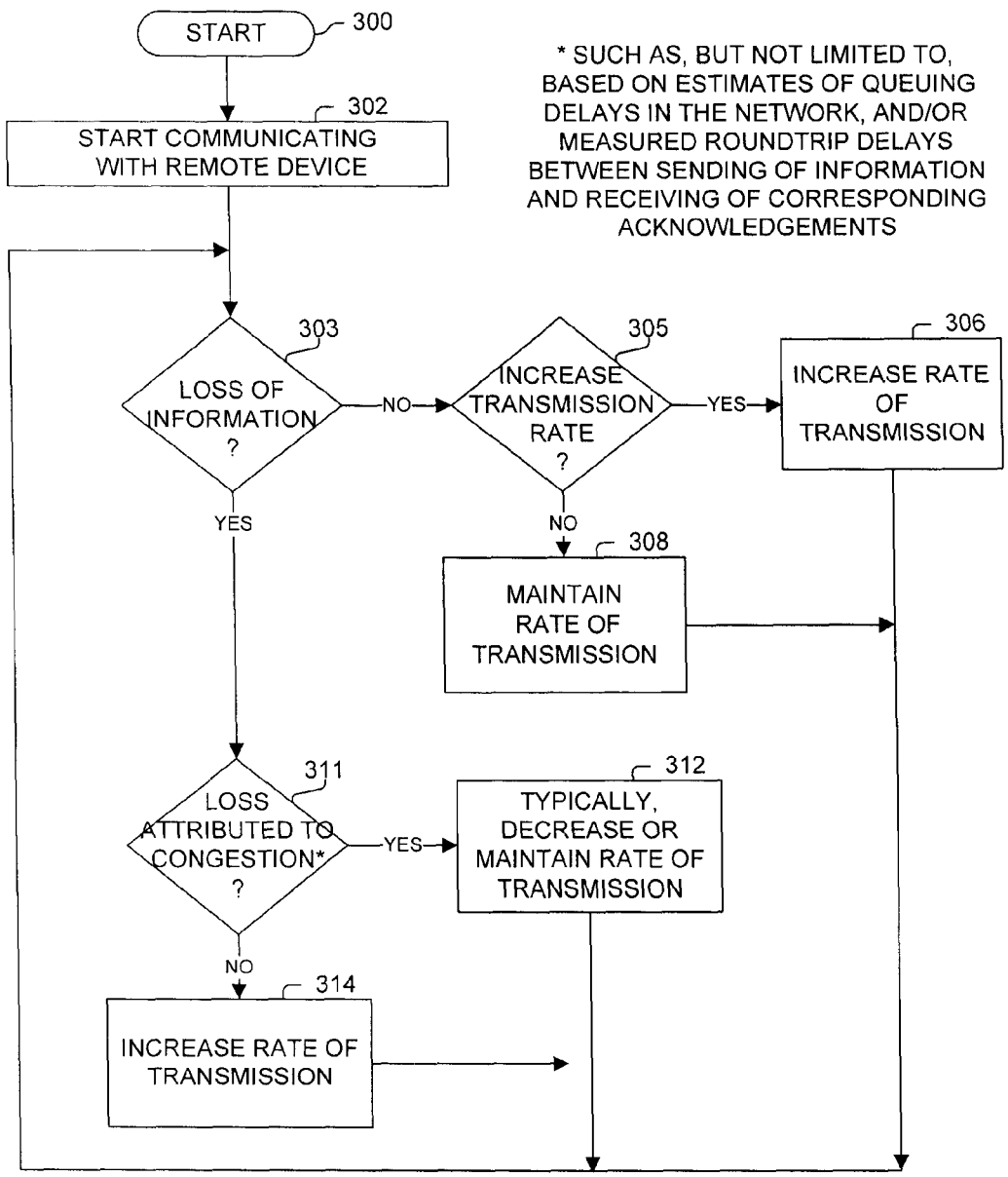
FIG. 3 illustrates a process performed in one embodiment.

FIG. 3 illustrates a process performed in one embodiment. Processing begins with process block 300. In process block 302, the apparatus starts communicating with a remote device, such as, but not limited, using TCP. As determined in process block 303, in response to identifying a loss of sent information (e.g., based on received acknowledgements), then processing proceeds to process block 311 (described hereinafter). Otherwise, as determined in process block 305, in light of no detected loss of information, if the rate of sending information should be increased, then in process block 306, it is increased; otherwise, in process block 308, the current rate of transmitting information is maintained. Continuing with process block 311, as determined therein such as, but not limited to, based on estimates of queuing delays in the network, and/or measured roundtrip delays between sending of information and receiving corresponding acknowledgements: if the loss of information is not attributed to congestion in the network, then in process block 314, the rate of transmission of the information is increased; otherwise, in process block 312, the rate of transmission of the information is typically decreased or sometimes maintained. Processing of the flow diagram of FIG. 3 returns to process block 303.

Figure 4:
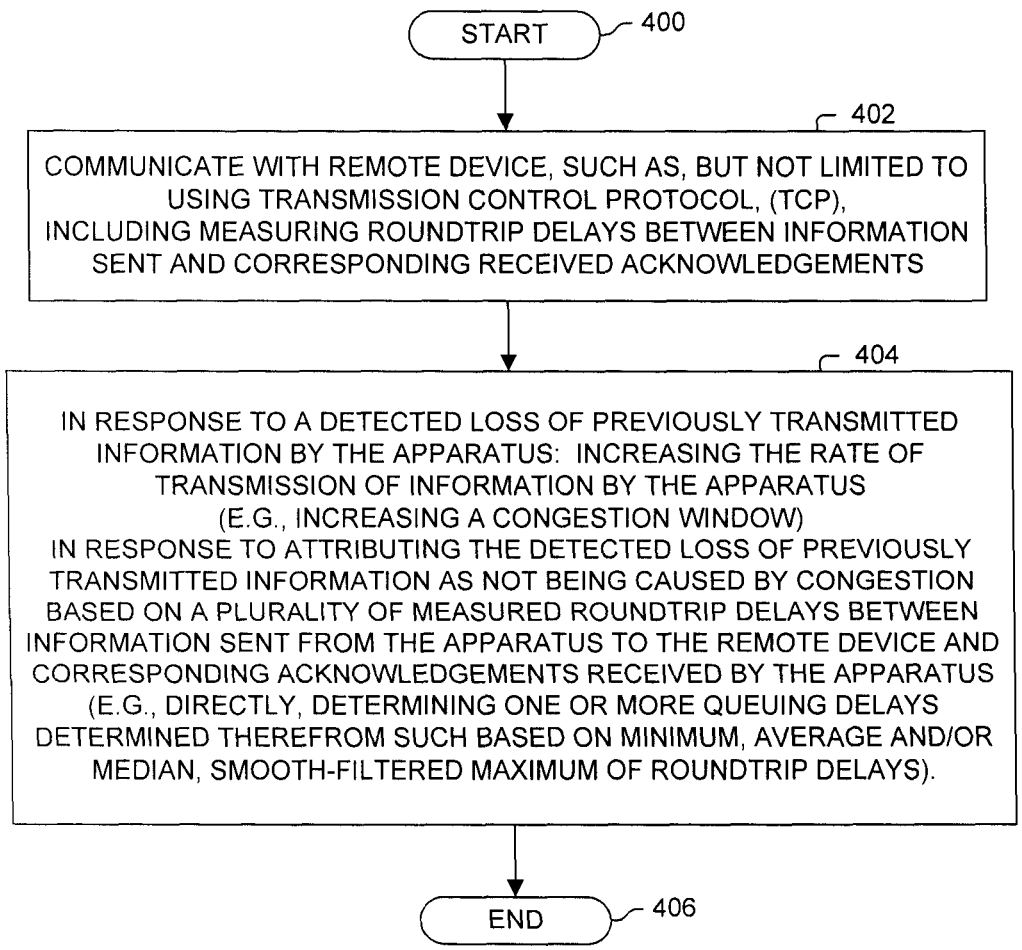
FIG. 4 illustrates a process performed in one embodiment.

FIG. 4 illustrates a process performed in one embodiment. Processing begins with process block 400. In process block 402, the apparatus communicates with a remote device, such as, but not limited to using Transmission Control Protocol, (TCP), including measuring roundtrip delays between information sent and corresponding received acknowledgements. In process block 404, in response to a detected loss of previously transmitted information by the apparatus: increasing the rate of transmission of information by the apparatus (e.g., increasing a congestion window) in response to attributing the detected loss of previously transmitted information as not being caused by congestion based on a plurality of measured roundtrip delays between information sent from the apparatus to the remote device and corresponding acknowledgements received by the apparatus (e.g., directly, determining one or more queuing delays determined therefrom such based on minimum, average and/or median, smooth-filtered maximum of roundtrip delays). Processing of the flow diagram of FIG. 4 is complete as illustrated by process block 406.

Figure 5:
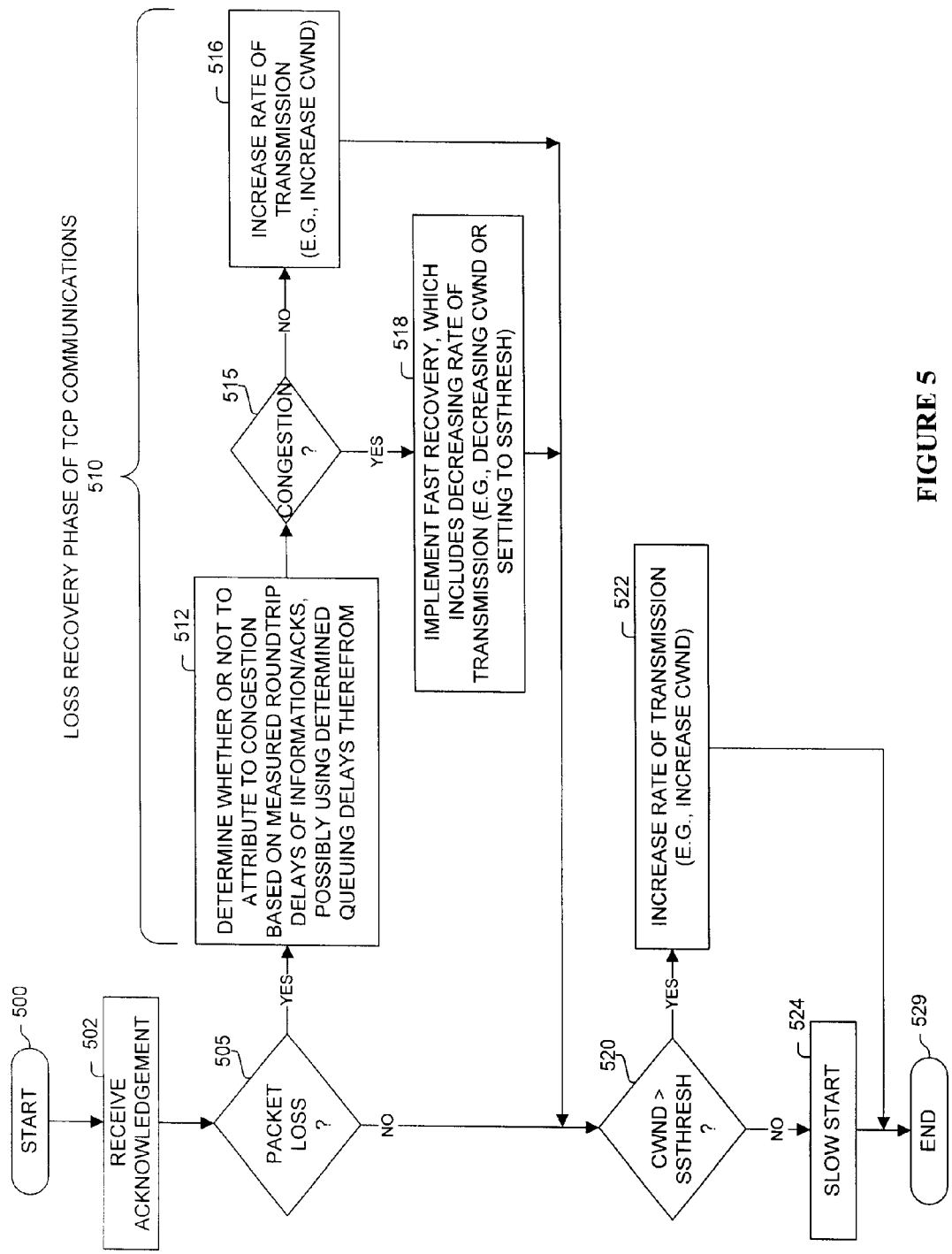
FIG. 5 illustrates a process performed in one embodiment.

FIG. 5 illustrates a process performed in one embodiment. Processing begins with process block 500, and in process block 502, the apparatus receives an acknowledgement for information previously sent. As determined in process block 505, in response to identifying a loss of transmitted data (e.g., based on some number of received acknowledgments allowing the identification of lost data), the apparatus enters a loss recovery phase of TCP communications (510), which includes process blocks 512-518.

In process block 512, the apparatus determines whether or not to attribute the packet loss to congestion based on measured roundtrip delays of information sent and corresponding acknowledgement received. One embodiment uses these roundtrip delays directly, possibly in combination with other information. In one embodiment, these roundtrip delays are used to estimate queuing delays, which are used to identify whether or not to attribute the packet loss to congestion in the network. In one embodiment, a queuing delay is determined based on an average of measured roundtrip delays, a minimum of measured roundtrip delays, and/or a median, smooth-filtered maximum of measured roundtrip delays. As determined in process block 515, if the loss of information was attributed to congestion in the network, then in process block 518, the apparatus implements fast recovery, which typically includes decreasing the rate of transmission of information (e.g., decreasing a congestion window (cwnd), or setting cwnd to the TCP slow-start threshold value (ssthresh)). Otherwise, in process block 516, in response to attributing the loss of transmitted information as not being caused by congestion in the network, the rate of transmission of information is increased (e.g., increasing a congestion window (cwnd)).

Continuing, as determined in process block 520, if a congestion window is greater than a threshold value, then in process block 522, the rate of transmission is increased (e.g., a congestion window (cwnd) is increased). Otherwise, in process block 524, the apparatus implements TCP slow start. Processing of the flow diagram of FIG. 5 is complete as indicated by process block 529.

FIGS. 6A and 6B illustrate a process performed in one embodiment. As shown, this process is described using pseudo code using BIC-TCP (e.g., typically implemented in Linux). Note, known functions, such as bictcp_recalc_ssthresh( ) and bictcp_update( ), and bictcp_reset( ) and/or known variables or other items in known implementation of TCP may be referenced.

Code 601 illustrates Initialization, wherein variables are initialized and blast_reset( ) 613 is performed. This code includes initializing a low threshold variable $\gamma_L$ and high threshold variable $\gamma_H$ for providing a band for identifying whether or not to attribute a packet loss to network congestion (as described hereinafter).

Code 602 illustrates On_each_ACK, which is performed in response to each received TCP acknowledgement to maintain some statistics about measured roundtrip and/or queuing delays. Variable dMin is used to maintain a lowest measured roundtrip time; sRTT is set a median, smooth-filtered maximum of the measured roundtrip delays; dMax maintains the maximum median, smooth-filtered maximum of the measured roundtrip delays; and sumRTT and cntRTT are maintained for calculating an average of the measured roundtrip delays.

Code 603 illustrates At_the_start_of_each_RTT_round, which resets variables maintained for each round of roundtrip times maintained.

Code 604 illustrates Packet_loss, which is performed in response to a packet loss to recalculate the ssthresh variable (e.g., perform TCP slow start, such as in process block 524 of FIG. 5).

Code 605 illustrates Fast_Recovery_for_each_ACK, which is performed in response to an identified packet loss (e.g., process blocks 512-518 of FIG. 5). Note, loss_predictor( ) 608 (FIG. 6B) determines whether or not to attribute the packet loss to congestion, and in response to attributing the packet loss as not due to congestion, the congestion window (cwnd) continues to be evolved (e.g., increased to increase the rate of transmission of information).

Code 606 illustrates Timeout, which is performed in response to a TCP timeout in order to reset the TCP code accordingly.

Code 607 illustrates recalc_ssthresh( ), which is performed to recalculate the slow start threshold value, with this calculation being different if the packet loss is attributed to network congestion or not to network congestion.

Code 608 illustrates loss_predictor( ), which determines whether to attribute a packet loss to network congestion or not to network congestion. As shown, if the average queuing delay (e.g., average roundtrip delay minus minimum observed roundtrip delay) is lower than a predetermined low threshold value amount of the longest queuing delay (e.g., longest roundtrip delay minus minimum roundtrip delay), then attribute the packet loss as not being related to network congestion. Also, if the average queuing delay is greater than a predetermined high threshold value amount of the longest queuing delay, then attribute the packet loss as being related to network congestion. Further, inside this band defined by the low and high threshold variables times the longest queuing delay, loss_predictor( ) determines to attribute the packet loss to congestion if the average queuing delay is currently increasing; else it attributes the packet loss as not being due to congestion.

Code 609 illustrates median_filter(RTT) used to median filter a measured roundtrip time based on multiple history values. One embodiment uses more and/or different history values, which may change the accuracy (possibly increasing) of loss_predictor( ).

Code 610 illustrates avg_delay( ) used to determine the average queuing delay (e.g., the average roundtrip delay minus the minimum measured roundtrip delay).

Code 611 illustrates low_threshold( ) used to determine the predetermined low threshold value amount of the longest queuing delay.

Code 612 illustrates high_threshold( ) used to determine the predetermined high threshold value amount of the longest queuing delay.

Code 613 illustrates blast_reset( ) used to reset the BIC TCP process and initialize some variables.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
   one or more processing elements and memory configured to communicate information with a remote device over a network;
   wherein said communication with the remote device includes, in response to a detected loss of previously transmitted information by the apparatus: increasing the rate of transmission of information by the apparatus in response to attributing the detected loss of previously transmitted information as not being caused by congestion;
   wherein said communication of information is performed using Transmission Control Protocol (TCP), and wherein said attributing of the detected loss of previously transmitted information as not being caused by congestion includes measuring a plurality of measured roundtrip delays between information sent from the apparatus to the remote device and an acknowledgement received by the apparatus corresponding to said sent information;
   wherein said attributing the detected loss of previously transmitted information as not being caused by congestion based on the plurality of measured roundtrip delays includes determining a plurality of queuing delays based on the plurality of measured roundtrip delays and said attributing said detected loss of previously transmitted information as not being caused by congestion based on the plurality of queuing delays; and
   wherein the current queuing delay is determined based on an average of the plurality of said measured roundtrip delays, a minimum of the plurality of said measured roundtrip delays, and a median, smooth-filtered maximum of the plurality of said measured roundtrip delays.

2. The apparatus of claim 1, wherein said communication using TCP with the remote device includes a loss recovery phase of said TCP communications triggered by the detected loss of previously transmitted information, with the loss recovery phase including performing active congestion control, with said active congestion control including said increasing the rate of transmission of information by the apparatus in response to attributing said detected loss of previously transmitted information as not being caused by congestion based on the plurality of measured roundtrip delays; and wherein the loss recovery phase includes reducing the rate of transmission of information by the apparatus in response to attributing said detected loss of previously transmitted information as being caused by congestion.

3. The apparatus of claim 2, wherein communication using TCP with the remote device includes using a congestion window (cwnd) for reacting to network conditions; and wherein said increasing the rate of transmission of information includes increasing the congestion window (cwnd); and wherein said reducing the rate of transmission includes decreasing the congestion window (cwnd).

4. An apparatus, comprising:
   one or more processing elements and memory configured to communicate information with a remote device over a network;
   wherein said communication with the remote device includes, in response to a detected loss of previously transmitted information by the apparatus: increasing the rate of transmission of information by the apparatus in response to attributing the detected loss of previously transmitted information as not being caused by congestion;
   wherein said attributing of the detected loss of previously transmitted information as not being caused by congestion includes estimating that queuing delays within the network between the apparatus and the remote device have not increased therefore not causing the detected loss; and
   wherein a current queuing delay of said queuing delays is determined based on an average of a first plurality of the plurality of measured roundtrip delays, a minimum of a second plurality of the plurality of measured roundtrip delays, and a median, smooth-filtered maximum of a third plurality of the plurality of measured roundtrip delays.

5. The apparatus of claim 4, wherein said communication of information is performed using Transmission Control Protocol (TCP).

6. A method, comprising:
   communicating, by a particular apparatus, with a remote device over a network, including:
   in response to a detected loss of previously transmitted information by the particular apparatus: increasing the rate of transmission of information by the particular apparatus in response to attributing said detected loss of previously transmitted information as not being caused by congestion based on a current queuing delay determined based on measured roundtrip delays between information sent from the particular apparatus to the remote device and an acknowledgement received by the particular apparatus corresponding to said sent information; and determining the current queuing delay based on an average of a first plurality of said measured roundtrip delays, a minimum of a second plurality of said measured roundtrip delays, and a median, smooth-filtered maximum of a third plurality of said measured roundtrip delays.

7. The method of claim 6, wherein said communicating with the remote device over the network includes using Transmission Control Protocol (TCP).

8. The method of claim 7, wherein communicating using TCP with the remote device includes using a congestion window (cwnd) for reacting to network conditions; and wherein said increasing the rate of transmission of information includes increasing the congestion window (cwnd); and wherein said decreasing the rate of transmission of information includes decreasing the congestion window (cwnd).

9. The method of claim 6, including: in response to the detected loss of previously transmitted information by the particular apparatus: decreasing the rate of transmission of information by the particular apparatus in response to attributing said detected loss of previously transmitted information as being caused by congestion based on the current queuing delay.

10. The method of claim 6, wherein said attributing said detected loss of previously transmitted information as not being caused by congestion based on the current queuing delay includes determining that an average queuing delay is not greater than a previously determined average queuing delay not including the current queuing delay.

11. The method of claim 10, including: in response to the detected loss of previously transmitted information by the particular apparatus: decreasing the rate of transmission of information by the particular apparatus in response to attributing said detected loss of previously transmitted information as being caused by congestion based on the current queuing delay.

* * * * *